United States Patent [19]
Okada

[11] Patent Number: 6,101,244
[45] Date of Patent: Aug. 8, 2000

[54] ELECTRONIC MAIL-CAPABLE COMMUNICATION TERMINAL DEVICE AND ELECTRONIC MAIL COMMUNICATION METHOD

[75] Inventor: Kazuhiro Okada, Moriyama, Japan

[73] Assignee: Murata Kikai Kabushiki Kaisha, Kyoto, Japan

[21] Appl. No.: 09/096,310

[22] Filed: Jun. 11, 1998

[30] Foreign Application Priority Data

Jun. 25, 1997 [JP] Japan ...................................... 9-169290
Aug. 21, 1997 [JP] Japan ...................................... 9-225306

[51] Int. Cl.⁷ ................................................ H04M 11/00
[52] U.S. Cl. .................................. 379/100.08; 379/93.24; 358/402
[58] Field of Search ......................... 379/100.08–100.15, 379/100.01, 100.17, 93.24, 93.05–93.08; 358/402, 407, 440, 442, 468

[56] References Cited

U.S. PATENT DOCUMENTS

| | | | |
|---|---|---|---|
| 5,418,625 | 5/1995 | Shimoosawa | 379/100.12 |
| 5,521,719 | 5/1996 | Yamada | 379/100.12 |
| 5,805,298 | 9/1998 | Ho et al. | 358/402 |
| 5,819,110 | 10/1998 | Motoyama | 379/100.12 |
| 5,905,777 | 5/1999 | Foladare et al. | 379/93.24 |
| 5,905,782 | 5/1999 | Lee et al. | 379/100.12 |
| 5,937,161 | 8/1999 | Mulligan et al. | 379/100.08 |

FOREIGN PATENT DOCUMENTS

| | | |
|---|---|---|
| 0 461 859 | 12/1991 | European Pat. Off. . |
| 0 615 377 | 9/1994 | European Pat. Off. . |
| 7-288557 | 10/1995 | Japan . |
| 7-288634 | 10/1995 | Japan . |
| 10-065866 | 3/1998 | Japan . |
| 1004167 | 10/1996 | Netherlands . |
| 96/41463 | 12/1996 | WIPO . |
| 97/26753 | 7/1997 | WIPO . |

*Primary Examiner*—Wing F. Chan
*Attorney, Agent, or Firm*—Hogan & Hartson LLP

[57] ABSTRACT

A communication terminal device which can send data by means of electronic mail or facsimile. The communication terminal device first tries to send the data by electronic mail over a network. In the meantime, the electronic mail address and facsimile number corresponding to a recipient are both stored in a memory. When a predetermined response is not received from the network during a network connection operation, or when there is mail returned in the sender's mailbox, the communication terminal device dials the facsimile number of the recipient and transmits the mail image data via facsimile communication.

8 Claims, 9 Drawing Sheets

ELECTRONIC MAIL-CAPABLE COMMUNICATION TERMINAL DEVICE AND ELECTRONIC MAIL COMMUNICATION METHOD

BACKGROUND OF THE INVENTION

1. Field of the Invention

The present invention relates to an electronic mail-capable communication terminal device like a facsimile machine provided with the ability to access electronic mail.

2. Description of the Related Art

In recent years, computer communication networks like the Internet, comprised of local computer communication networks further networked over communications lines and capable of transmitting electronic mail, have grown. Computer communication networks allow for easy error correction, and permit communication with computers not only domestically, but from overseas, as well, at only the cost of communicating with a local provider (a service that provides connection to a computer network.)

Conventional communication procedures and methods for Group 3 ("G3", International Telecommunications Union (ITU)-T recommendation T.4) facsimile machines differ from that of computer communication networks, and therefore it is not possible to connect these machines directly to computer communication networks. However, by converting into electronic mail format the image data of a document to be sent, facsimile machines can be enabled to transmit image data to these computer communication networks.

When a facsimile machine provided with electronic mail communication capabilities transmits electronic mail via the Internet, the facsimile machine dials the telephone number of the Internet Service Provider ("ISP"), logs-in by entering the user name and password of the registered user, and then sends a electronic mail. The host computer of the provider locates and sends the mail to an optimal gateway on the Internet in order to transmit the mail to the mail address of the recipient. The electronic mail message is passed from gateway to gateway along the Internet, and finally to the server in which the recipient's mailbox is located. The mail is then stored in the mailbox at the recipient's electronic mail address.

The recipient accesses the network, checks his or her mailbox, and if retrievable mail is found, downloads the mail from the mailbox.

As described above, the mail sender must first access the network provider in order to send the mail. However, during certain periods there may be heavy traffic on the ISP's phone lines, and this may prevent a user from being able to dial-in to its provider. Further, if the user name or password input during log-in is incorrect, the log-in will fail. Still further, if the recipient's mail box is overloaded, the mail box (mail server) may reject any new incoming messages.

Further, when the sender checks its mailbox and discovers the presence of mail that has been returned from the network because the recipient is unknown ("returned mail"), the original document must be rescaned in order to be resent. The presence of the returned mail is known by finding the character code of the Subject field (which carries subject information of the mail such as title of the mail) in the data that follows the mail header and finding a particular code which specifies the sender itself in the character code.

SUMMARY OF THE INVENTION

It is an object of the present invention to provide an electronic mail-capable communication terminal device which reliably transmits electronic mail to a remote communication terminal device without delay. To this end, the electronic mail-capable communication terminal device dials the facsimile number of the recipient's communication terminal device such that electronic mail data can be transmitted even at times when, for example, the sender is unable to connect to the provider, unable to log-in, unable to send mail even after logging-in, or during a certain time period when lines to the provider can be expected to be busy.

It is another object of the present invention to provide an electronic mail-capable communication terminal device which makes it unnecessary to rescan the original document when resending the mail. To this end, the electronic mail-capable communication terminal device stores the electronic mail message in its own image memory when it tries to send the mail over the network for the first time, or stores the mail message in its own mail box on the network by adding itself (the sender) as a recipient of the electronic mail. The mail message stored in the image memory or mailbox can be used when resending the electronic mail.

The electronic mail-capable communication terminal device of the present invention may be provided with a storage means for storing the electronic mail address and telephone number of a recipient, and a transmission means for dialing the telephone number of the recipient and transmitting electronic mail data to the recipient when a predetermined response is not received during connection with the network. If, during a network connection operation the communication terminal device cannot connect to the provider over the telephone line or cannot log into the network, a predetermined response is not received from the network. Then, the communication terminal device dials a telephone number (facsimile number) of the destination and transmits the electronic mail as facsimile data. The facsimile number of the remote device is stored in the storage means beforehand in such a manner that the facsimile number is findable from the electronic mail address of the electronic mail recipient. Consequentially, even if electronic mail cannot be sent, the data can still be sent reliably via facsimile communication.

The electronic mail-capable communication terminal device may further be provided with a second transmission means for transmitting the electronic mail data to the destination by dialing the telephone number (facsimile number) of the recipient's device when mail cannot be transmitted over the network after connection with the network has been established. Mail reception may be refused by the provider (or server) on the recipient side after connection with the network has been established. Then, the telephone number of the remote terminal device corresponding to the electronic mail address of the destination stored in the storage means is dialed, and the electronic mail message is transmitted as facsimile data.

The electronic mail-capable communication terminal device may further be provided with a second storage means for storing a predetermined time period, and a third transmission means for transmitting the electronic mail data by dialing the telephone number of the recipient when the current transmission time overlaps with the predetermined time period. A particular time period (for example, a time period when it can be assumed that the telephone lines of the provider will be busy) is stored. When electronic mail data is to be transmitted during this time period, the telephone number of the communication terminal device of the recipient corresponding to the electronic mail address of the recipient of the electronic mail message is dialed, and the data transmitted as facsimile data without being sent as electronic mail. Consequentially, even during time periods when the phone lines to the provider are busy, data can be sent as facsimile data to a recipient without delay.

According to a second aspect of the present invention, the communication terminal device of the present invention provided with electronic mail and facsimile communication capabilities comprises a storage means for storing an electronic mail message which has been transmitted to a destination and information identifying such transmitted electronic mail, a detection means for detecting the presence of returned mail inside it's own mailbox, a comparing means for comparing the identifying information of the returned electronic mail with the identifying information stored by the storage means, and a transmission means for resending to the destination the electronic mail message from the storage means if the identifying information of the returned electronic mail and the information stored by the storage means are the same. At least the subject information (e.g., title) of the mail is stored along with the message of the mail in the image memory when the mail is transmitted to the destination. When the presence of returned mail is detected in the mailbox, the subject information of the returned mail and the subject information stored in image memory are compared. If they are the same, the electronic mail message is resent from the image memory. Consequentially, the user does not have to rescan a document in order to resend the same mail.

The transmission means may resend the electronic mail stored from the memory via facsimile communication. Consequentially, even if the electronic mail addressee is entered incorrectly and the electronic mail is undeliverable, the document to be sent can be reliably transmitted to the recipient by resending it via facsimile communication.

The communication terminal device may further be provided with a means for additionally including the sender itself as a recipient of the electronic mail message being transmitted, and both the transmitted electronic mail message and identifying information about this electronic mail message may be stored in the mailbox by specifying the sender as one of the recipients and transmitting a copy of the electronic mail message to the sender's mailbox. When electronic mail is transmitted, the sender itself is specified as one of the recipients of the electronic mail message by means of "c.c." for example. The transmitted message is also sent to the sender's mailbox, and can be saved in the mailbox as image data for resending or forwarding to another remote device. The memory of the communication terminal device is not used to store the mail and associated information, but the mail box on the network is used. Consequentially, the amount of memory taken up inside the sender's device can be reduced.

DETAILED DESCRIPTION OF THE INVENTION

Figure 1:
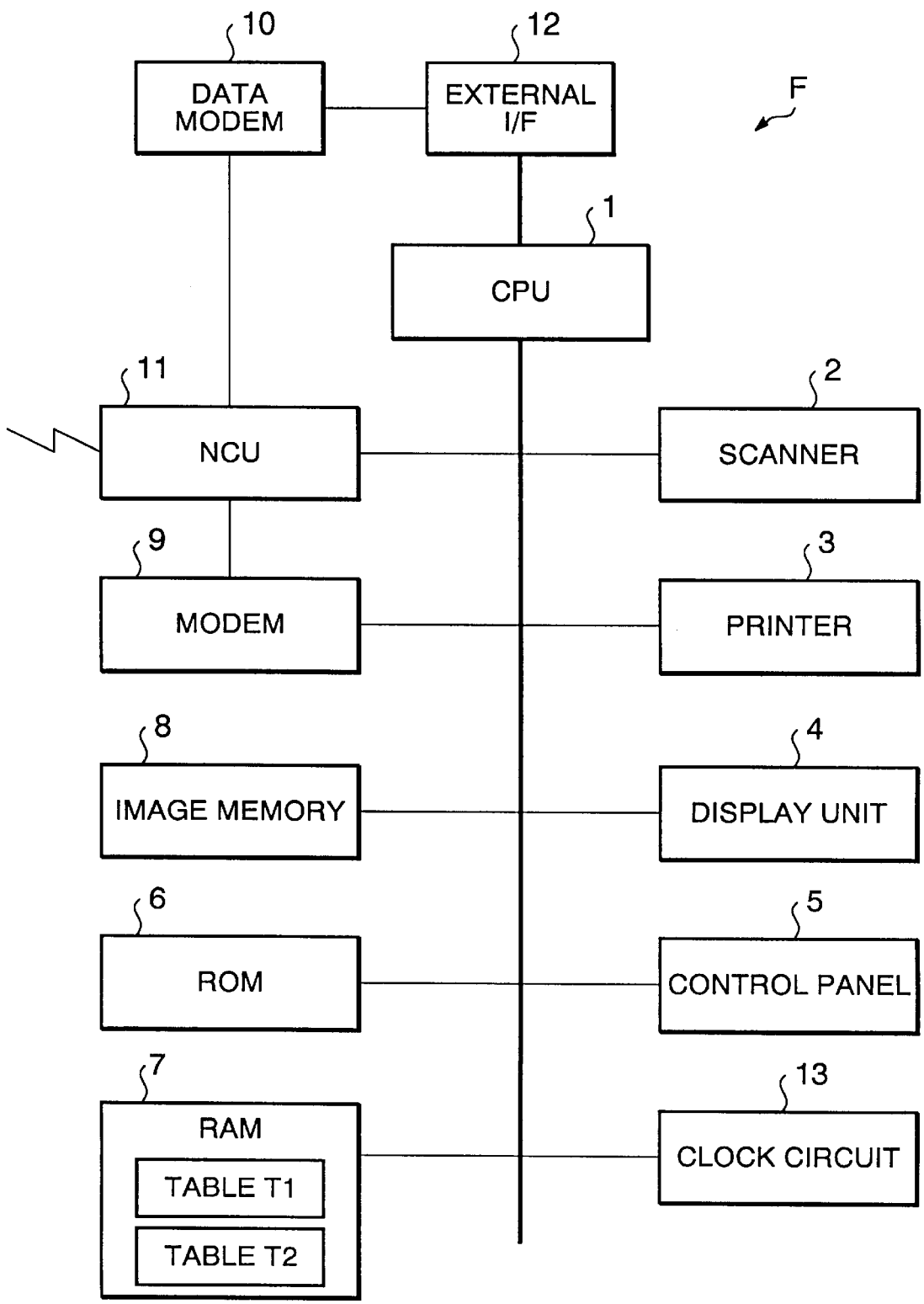
FIG. 1 is a block diagram of a first embodiment of the present invention embodied in a facsimile machine.

Referring to FIG. 1, illustrated is a block diagram showing the structure of a first embodiment of the electronic mail-capable facsimile machine F according to the present invention. The facsimile machine F of this embodiment utilizes the Internet as a computer communication network.

CPU 1 controls not only the various hardware elements of the facsimile machine F over buses, but also executes communication procedures of software stored in ROM 6 which includes encoding or decoding image data of an original document according to coding schemes such as MH, MR, MMR, etc., converting the coded image data to and from TIFF format, converting to and from binary text format, editing the electronic mail, switching the modems, and controlling the RS232C line by using AT commands.

At times when, for example, connection cannot be achieved with the provider over the phone line, log-in fails, mail reception is refused after logging in, electronic mail is to be transmitted during a particular time period (for example, when it can be assumed that lines to the provider will be busy), or when there is returned mail in the mailbox, CPU 1, as described in detail below, dials the facsimile number of the recipient, executes a software procedure to transmit the electronic mail image data as facsimile data, and executes a software procedure to print out notification that the recipient's facsimile number was dialed and that electronic mail image data was sent as facsimile image data.

In image format conversion, when electronic mail image data is transmitted, the G3-formatted image data is converted into a TIFF (Tagged Image File Format) image data which can be used by common computers. When image data is received, the image is converted back from TIFF to G3 format. TIFF format has been made public by Adobe Systems, Inc., and treatment of various classes of image data has been specified including not just binary black-and-white data, but also gray-scale and full-color. One of these classes, class F, defines the conversion of image data by MH, MR, MMR, etc., (i.e., encoded G3-type image data). Consequentially, by appending Class F TIFF header information to the top of the G3 image data, TIFF conversion can be enabled.

In binary text conversion, binary data is converted to text data when electronic mail image data is transmitted, and text data is converted to binary image data when electronic mail image data is received. Since some computers on the Internet cannot handle electronic mail of binary image data, when binary TIFF image data is sent over the Internet, it must first be converted to text data in order for it to be reliably received by the recipient. The text data format for use over the Internet has been specified as 7-bit code in RFC (Request For Comments) 822 published by the Internet Engineering Task Force (IETF).

RFC 822 and 1341 discloses how to use MIME (Multipurpose Internet Mail Extensions) base 64 to convert between binary and text data. According to this method, each of 64 characters (capital letters, lower case letters, numbers, and "+" and "/") is assigned to one value of the 6-bit binary data set for executing the conversion to text data.

In mail editing, when electronic mail image data is sent, CPU 1 appends electronic mail header information to the text-formatted TIFF image data enabling it to be sent as electronic mail. When electronic mail image data is received, CPU 1 removes the electronic mail header information from the electronic mail text formatted data, and extracts the text data-converted TIFF image data. Since certain information is included in the header of Internet electronic mail for administrative purposes, CPU 1 appends "From: (the user's electronic mail address)," "To: (the recipient's electronic mail address)," and "Subject: (the title or subject information)" to the top of the TIFF image data.

The scanner 2 scans an image with an image scanner like a CCD and outputs binary black-and-white image data. The printer 3 is provided with an electro-photography type printer and outputs image data received from other G3 facsimile machines or received over the Internet. The display unit 4 is provided with an LCD device, and displays the operating status of the facsimile machine F and image data.

The control panel 5 contains a number pad, speed-dial keys, one-touch dialing keys and various function keys required to operate the facsimile machine F. Recipients' mail addresses and facsimile numbers are registerable in connection with the one-touch dial keys in the form of table created in the memory. ROM 6 stores software required to operate the facsimile machine F. RAM 7 is comprised of SRAM, flash-memory, or the like, and temporarily stores data generated during execution of the software. RAM 7 is provided with Table T1 containing, for example, the facsimile numbers and electronic mail addresses of the recipients corresponding to the one-touch dial keys. RAM 7 also stores Table T2 containing the predetermined time periods (the time at which it can be expected that the phone lines to the provider will be busy, for example), selection of transmission mode according to the time of calling the provider (whether or not the facsimile machine F only sends data by means of facsimile transmission without sending the data by means of electronic mail if the time of calling the provider is in the predetermined time period), the number of times the facsimile machine F should try to redial the provider when it fails to connect, and the number of times the facsimile machine F should try to log in when it fails to long in after establishing the connection with the provider.

The image memory 8 is comprised of DRAM or the like, and stores image data. The modem 9 is a modem for normal facsimile communication of image data scanned in by the scanner 2, and is not provided with data communication capabilities. The data modem 10 is a modem for communication of image data converted to electronic mail for transmission or reception via the Internet. The data modem 10 is connected to, for example, an external telephone terminal provided in a chip inside NCU 11 via a telephone cable, and also connected to the serial port of an I/F 12 which is used for connection of a personal computer via an RS232C line. NCU 11 opens and closes an analog telephone circuit. The clock circuit 13 determines the current time.

Figure 2:
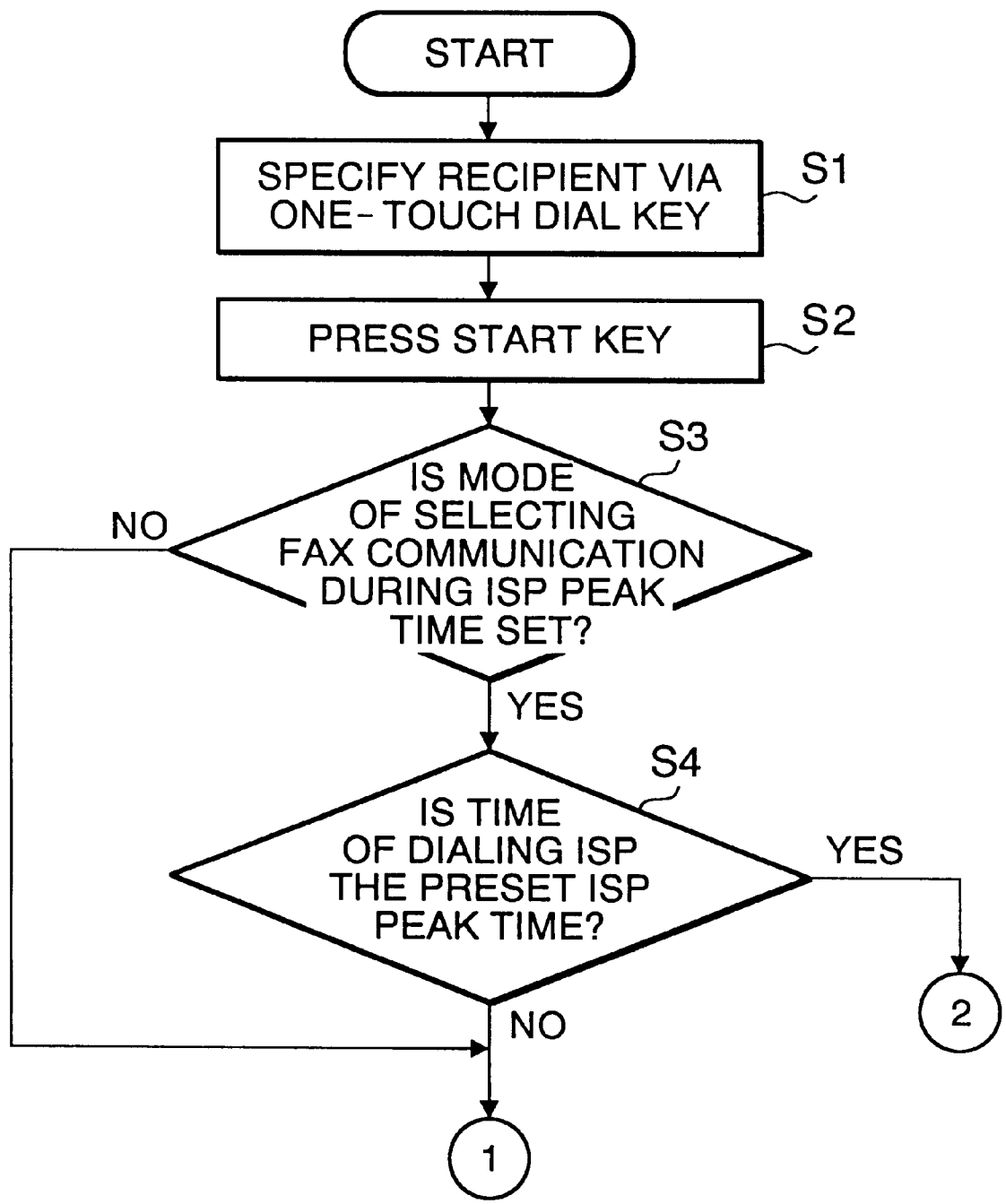
FIGS. 2 and 3 illustrate in combination a flow chart showing the operation of the facsimile machine shown in FIG. 1 during electronic mail transmission.

Next, the electronic mail transmission procedure of the facsimile machine F will be described based on the flow chart of FIGS. 2 and 3.

A recipient is selected by pressing a one-touch dial key (Step S1). When the start key is pressed (Step S2), CPU 1 references Table T2 in RAM 7 and determines if the facsimile machine F has been set to an automatic fax/email selection mode depending upon the time of data transmission (data is normally transmitted to a destination by means of electronic mail, but it is a peak time, data is transmitted by facsimile procedures (Step S3). If this automatic fax/email selection mode is OFF, the program proceeds to Step S5.

If, however, the automatic selection mode is ON, then the CPU 1 checks the current time from the clock circuit 13, and determines whether the current time overlaps with the preprogrammed provider peak times stored in Table T2 of RAM 7 (Step S4). If the current time does not overlap with the programmed ISP peak time, then the program proceeds to Step S5 and dials the ISP.

If, however, the current time overlaps with the programmed ISP peak time, then CPU 1 references Table T1 in RAM 7 to determine whether or not the facsimile number of the recipient is stored along with the electronic mail address corresponding to the one-touch dial key just pressed (Step S13). If the CPU 1 determines that no facsimile number is available, the program ends; but if a facsimile number is found, the mail image data is transmitted to the remote facsimile machine via a normal facsimile transmission procedure (Step S14).

If the facsimile machine F is not set to the automatic fax/email selection mode to avoid performing electronic mail delivery during ISP peak times (No at Step S3), or if the current transmission time does not overlap with the programmed ISP peak time (No at Step S4), the provider is dialed (Step S5), and CPU 1 determines whether connection with the ISP has been successfully achieved by determining whether or not a particular response signal is received over the telephone line from the provider (Step S6).

If the predetermined response signals are not received over the phone line from the provider and connection has failed, connection with the provider is reattempted by redialing the provider up to a specified number of times recorded in Table T2 stored in RAM 7 (Steps S5–S7).

If the provider is repeatedly dialed the specified number of times but connection with the provider is still not achieved, the CPU 1 checks Table T1 in RAM 7 to determine whether or not a facsimile number is available for the electronic mail address corresponding to the one-touch dial key the user specified at Step S1 (Step S13). If CPU 1 determines that no such facsimile number is stored, the program ends, but if a facsimile number is available, the CPU 1 sends the electronic mail image data to the remote facsimile machine by facsimile communication by way of a normal facsimile communication procedure (Step S14).

If connection with the provider is achieved on the first attempt, or within the specified number of times of redialing, the login-script is executed (Step S8). Success of logging-in is determined depending upon whether or not the predetermined response signal is received from the ISP (Step S9).

If the response signals are not received from the ISP and logging-in fails, the CPU 1 will reattempt to log-in up to the specified number of times listed in Table T2 in the RAM 7 (Step S8 through Step S10).

If logging-in is not achieved in spite of reattempting the specified number of times, CPU 1 checks Table T2 in RAM 7 to see whether or not a facsimile number is available for the electronic mail address corresponding to the one-touch dial key the user specified at Step S1 (Step S13). If it is, determined that no such facsimile number is stored, the program ends, but if a facsimile number is available, the electronic mail image data is sent to the remote facsimile machine via normal facsimile communication (Step S14).

If log-in is successful on the first attempt, or within the specified number of attempts, the electronic mail data is transmitted over the phone line (Step S11). CPU 1 then determines if electronic mail transmission has been completed or not by detecting if predetermined response signals are received from the mail server upon sending of the electronic mail data (Step S12).

If the predetermined response signals are not received from the remote mail server and electronic mail uploading is thus not completed successfully, the CPU 1 checks Table T1 in RAM 7 to see whether or not a facsimile number has been stored along with the electronic mail address in the one-touch dial key table (Step S13). If it is determined that no such facsimile number is stored, the program ends, but if a facsimile number is available, the electronic mail data is sent to the remote facsimile machine via normal facsimile communication (Step S14).

If the predetermined response signals are received from the remote mail server and mail uploading has been completed, then the program ends.

Further, the printer 3 of the facsimile machine F prints out notification to the effect that the electronic mail image data has been transmitted by facsimile transmission when this is the case.

Figure 4:
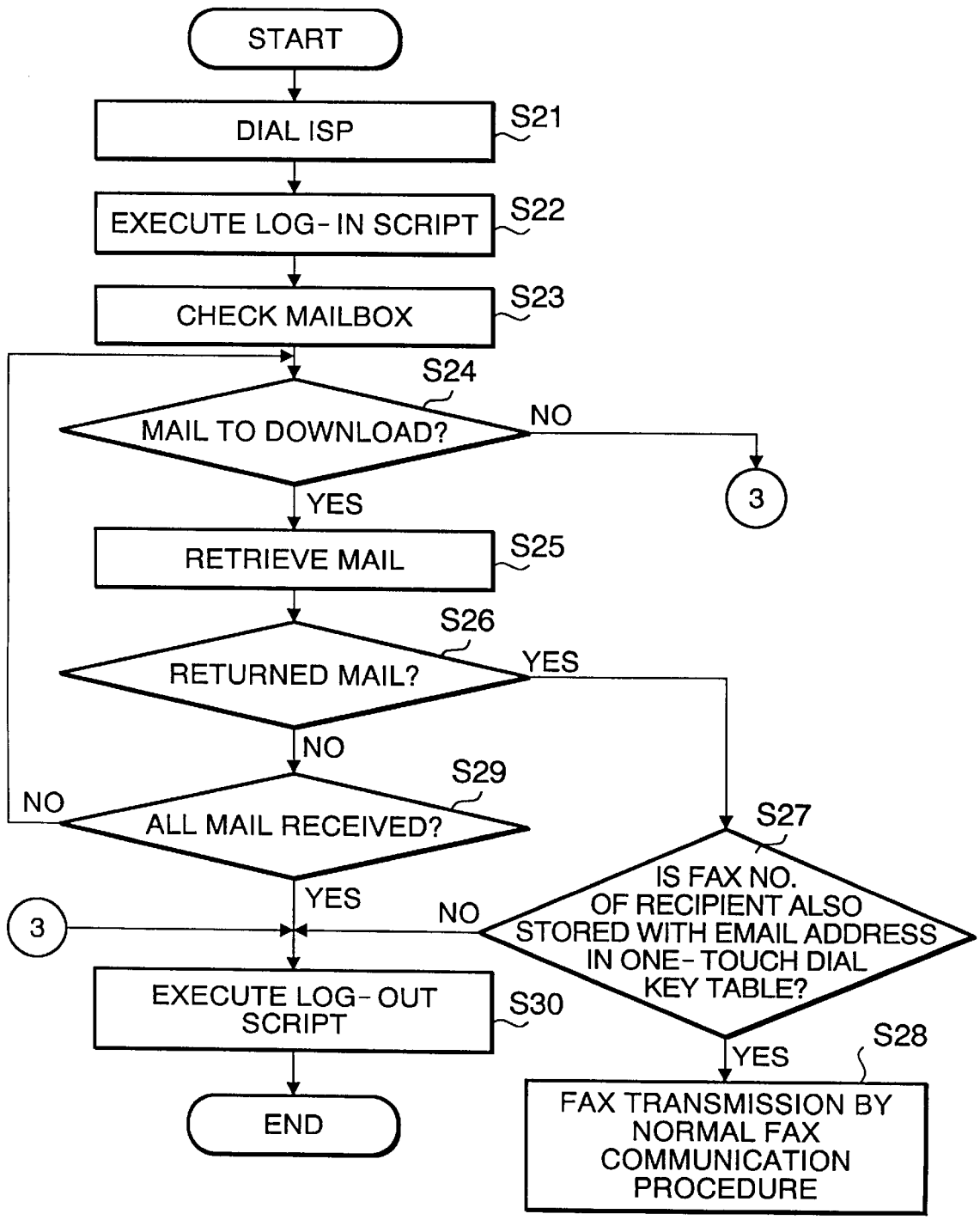
FIG. 4 is a flow chart showing the operation of the facsimile machine shown in FIG. 1 during electronic mail reception.

Next, the electronic mail reception procedure by the facsimile machine F of the present embodiment will be described with reference to the flow chart of FIG. 4.

The facsimile machine F dials the provider (Step S21), and executes the log-in script (Step S22). When the facsimile machine F successfully logs in, it checks a mailbox (Step S23), and searches to determine if there are any messages to download (Step S24).

If there is no mail to be downloaded the facsimile machine F performs a log-out script (Step S30) and the program ends.

On the other hand, if there is mail to be downloaded, the mail is retrieved (Step S25). The CPU 1 then determines by means of checking the header information of the received message whether or not this mail is a mail returned back without reaching the recipient's mail server (Step S26).

If the received mail is not returned mail, CPU 1 determines whether there is another message to be downloaded (Step S24), and continues executing Steps S24 through S29 until all the mail to be downloaded has been retrieved.

If the received mail is the returned mail, CPU 1 checks Table T1 in RAM 7 to see whether or not a facsimile number of the recipient is available together with the electronic mail address corresponding to the one-touch dial key pressed by a user (Step S27). If it is determined that no such facsimile number is stored, the program ends, but if a facsimile number is available, the electronic mail data is sent to the remote facsimile machine via normal facsimile communication (Step S28).

Further, the facsimile machine F prints out notification from the printer 3 to the effect that the electronic mail image data has been transmitted by facsimile transmission.

Figure 3:
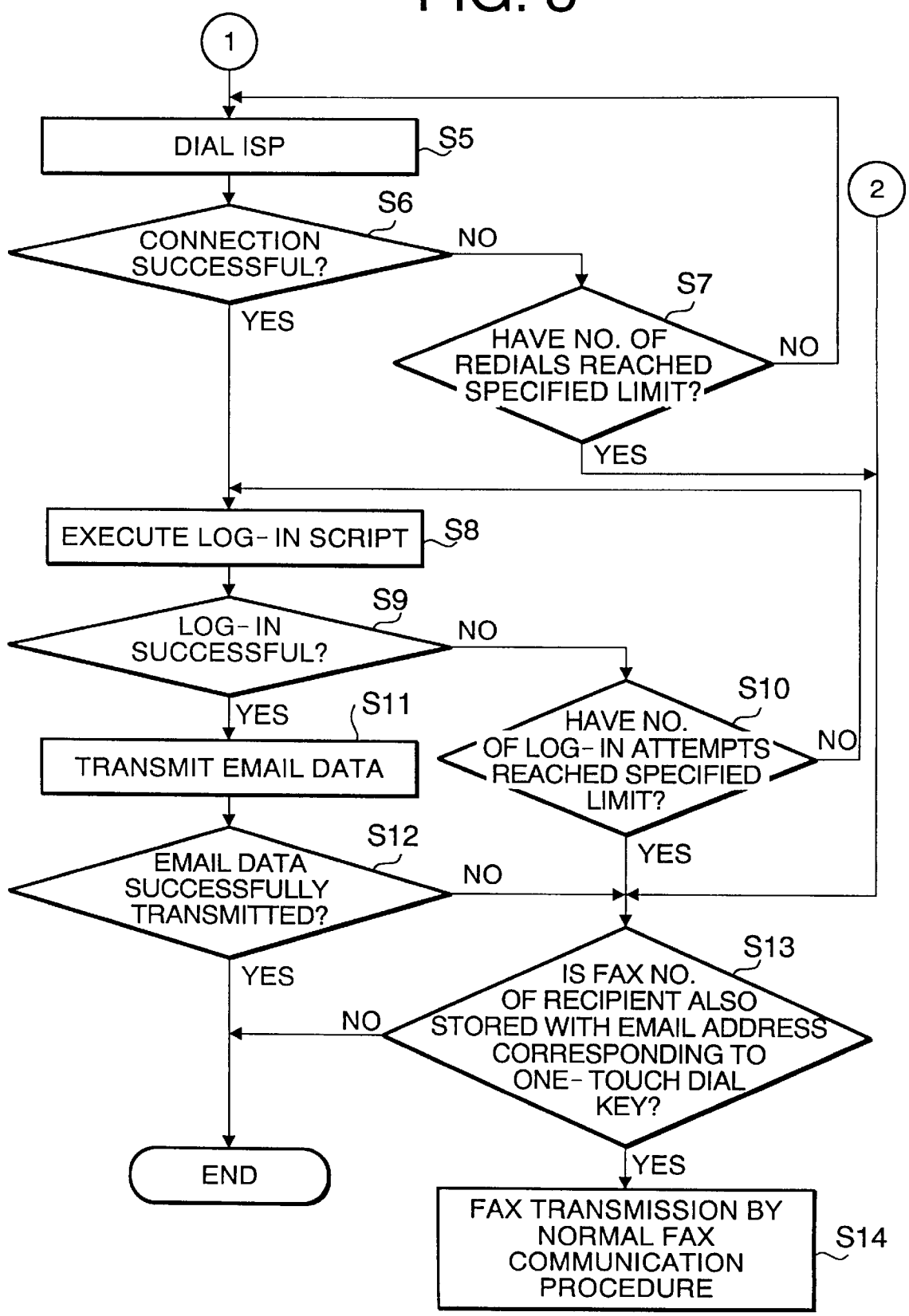

It should be noted that the checking of the mail box described above may be performed following the electronic mail transmission (e.g., the step S23 may be executed following the step S12 of FIG. 3).

Further, electronic mail transmission between two facsimile machines has been described in the above embodiment of the present invention, but the present invention may also be applied to any communication terminal device provided with electronic mail communication capability, like a personal computer, for example.

A second embodiment of the present invention is now described with reference to FIGS. 5 through 9. Since the hardware configuration of this second embodiment is the same as in the first, a description of this structure is herein omitted.

Figure 5:
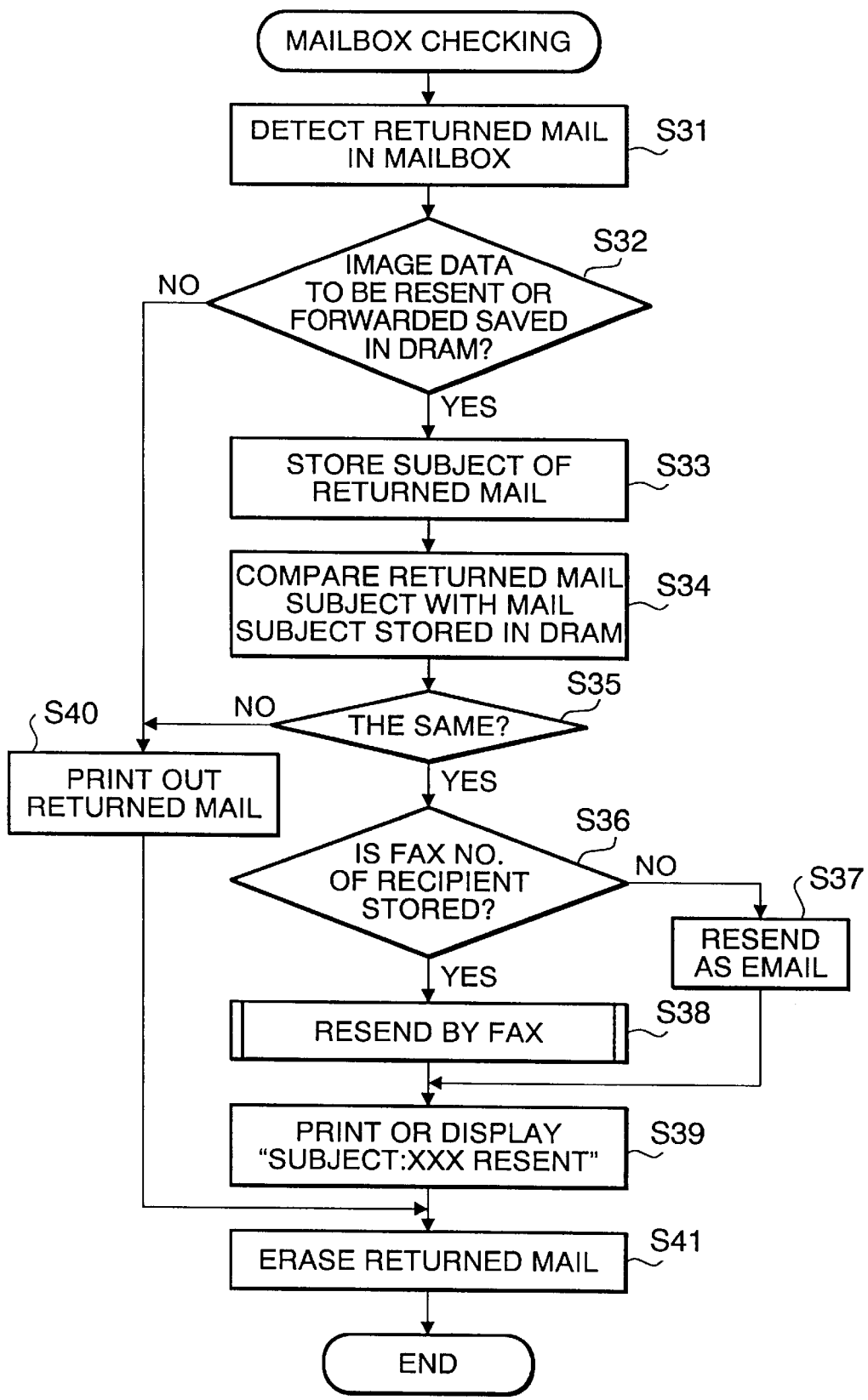
FIG. 5 is a flow chart showing the operation of a second embodiment of the present invention embodied in a facsimile machine during checking of a mailbox.

First, the mail box checking operation of the facsimile machine will be described based on the flow chart in FIG. 5.

CPU 1 checks the mail box and determines whether or not there is returned mail (Step S31). It then determines whether or not the original document data which can be resent or forwarded has been saved in DRAM (image memory 8) at Step S32. If such data has been saved, CPU 1 extracts and stores the Subject (field) of the returned mail existing after the header of the returned mail in a predetermined region of RAM 7 (Step S33), and compares this Subject with the Subject of the data saved in the DRAM (Step S34).

If the subjects are the same (Step S35), CPU 1 then checks to see if the facsimile number of the recipient is stored along with the image data in the image memory 8 (Step S36). If the facsimile number is not stored, the facsimile machine resends the image data to the destination from the image memory 8 by electronic mail transmission (Step S37).

On the other hand, if the facsimile number is stored in the image memory 8, the facsimile machine F now sends the image data from the image memory 8 to the recipient facsimile machine via facsimile transmission (Step S38). This is because there is a high probability that the reason the mail was returned was that the recipient's address is incorrect.

If the image data is retransmitted in either Step S37 or Step S38, the facsimile machine prints out or displays a message such as "Subject: XXX resent" (Step S39).

If it is determined at Step S32 that there is no image data for retransmission or forwarding saved in the DRAM or at Step S35 that there is no data having the same Subject stored in DRAM, then the facsimile machine downloads the returned mail and prints it out (Step S40), thereby informing the user of the presence of returned mail. The user then rescans the undelivered original document, and resends it to the recipient via either electronic mail or facsimile transmission.

When electronic mail retransmission or printing out is completed, the facsimile machine sends a command to the provider network to erase the returned message in the mail box (Step S41).

Figure 6:
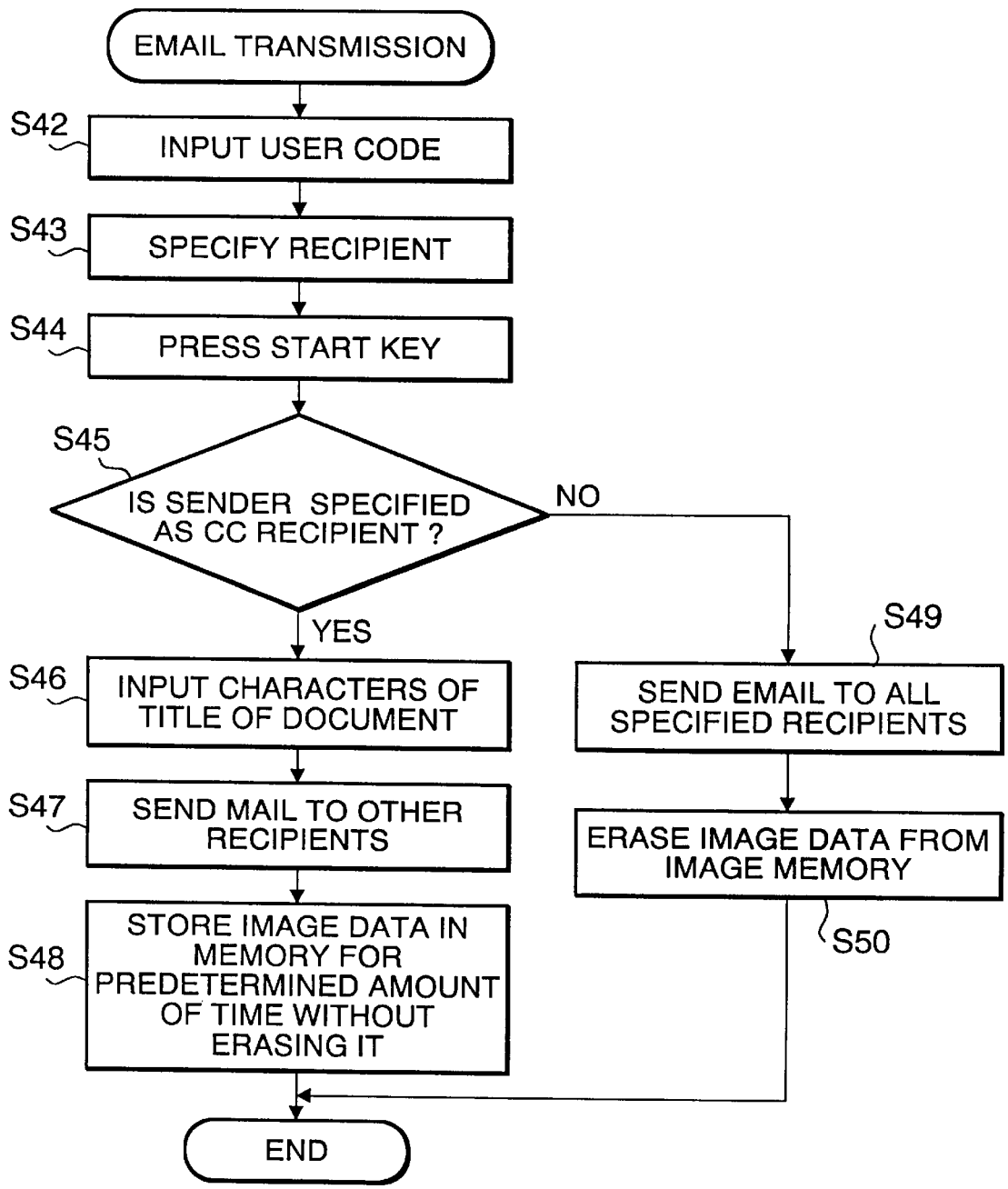
FIG. 6 is a flow chart showing the operation of the facsimile machine of the second embodiment during electronic mail transmission with a copy of mail data being stored in an image memory.
Figure 7:
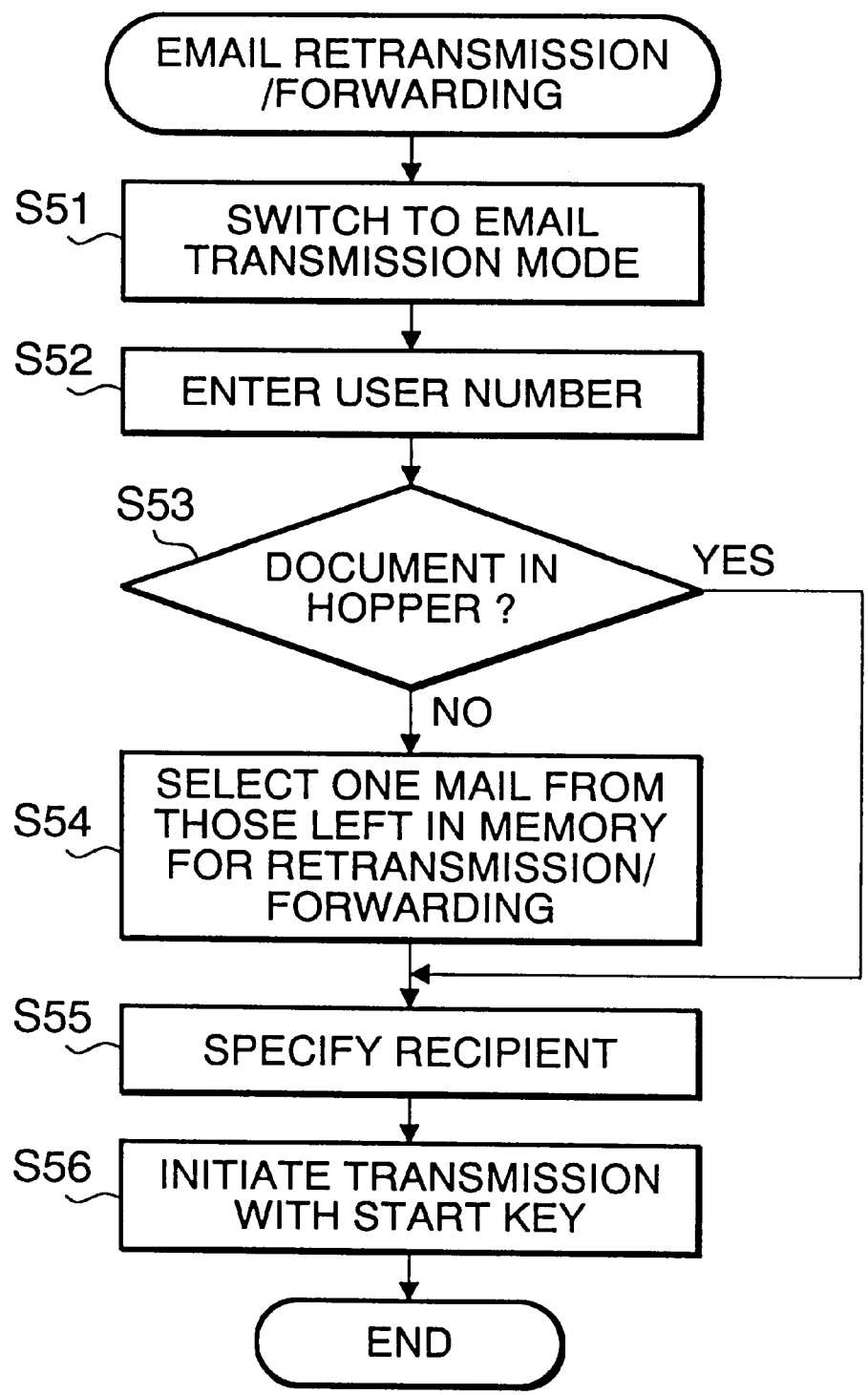
FIG. 7 is a flow chart showing the operation of the facsimile machine of the second embodiment using the electronic mail stored in the image memory by the procedure of FIG. 6 during retransmission or forwarding to another destination of electronic mail.

Next, the operation of the facsimile machine when image data is stored in DRAM for retransmission or forwarding to another destination while the image data is being first transmitted to the destination by electronic mail and the operation of the facsimile machine when the data is actually resent or forwarded to another destination from DRAM will be described based on the flow charts in FIGS. 6 and 7.

The user inputs a user number (Step S42), and selects a recipient by pressing a one-touch dial key or directly inputting the character code of a recipient address (Step S43). When the user presses a start key (Step S44), CPU 1 then determines whether or not the user's electronic mail address is added as a carbon copy (cc) recipient (Step S45).

If the user is specified as the cc recipient, the facsimile machine F requests the user to enter the characters of the title of the original document (Step S46) and sends the image data to the designated recipient from the image memory 8 except for the cc recipient (Step S47). In the meantime, the CPU 1 stores the image data for a predetermined time without erasing it from the image memory 8 after transmission (Step S48).

On the other hand, if the user is not specified as a cc recipient at Step S45, the facsimile machine transmits the image data from the image memory 8 to all specified recipients via electronic mail transmission (Step S49), and erases the image data from the image memory 8 (Step S50).

In this way the image data to be resent or forwarded to additional recipients is saved in the image memory 8 when the mail is first transmitted. When the mail is returned and retransmission is required or the same message is to be forwarded to additional recipients, the user switches the facsimile machine F to an electronic mail transmission mode from a stand-by mode (Step S51).

When the user code is entered (Step S52), the CPU 1 determines whether or not an original document has been placed in a document hopper (not shown) (Step S53). If a document has not been placed in the hopper, the facsimile machine F displays a list of the subject information of the documents (e.g., titles of the documents or image data, or addresses of the recipients) saved in the image memory 8 on the LCD of the display unit 4. By selecting one of numbers appended to the subject information in the displayed list, the user can specify a mail message to be resent or forwarded (Step S54). Since there is a high probability that the cause of the mail being returned is a mistaken address, the mail address is manually input by the user (Step S55). When the user presses the Start key, the facsimile machine F begins the mail transmission process (Step S56).

On the other hand if a document has been placed on the hopper at Step S53, the program moves to Step S55 to perform a normal transmission procedure. The user specifies the recipient either by pressing a one-touch dial key or inputting the character string of the recipient's address directly (Step S55). When the user presses the start key, the facsimile machine begins the electronic mail transmission process (Step S56).

Figure 8:
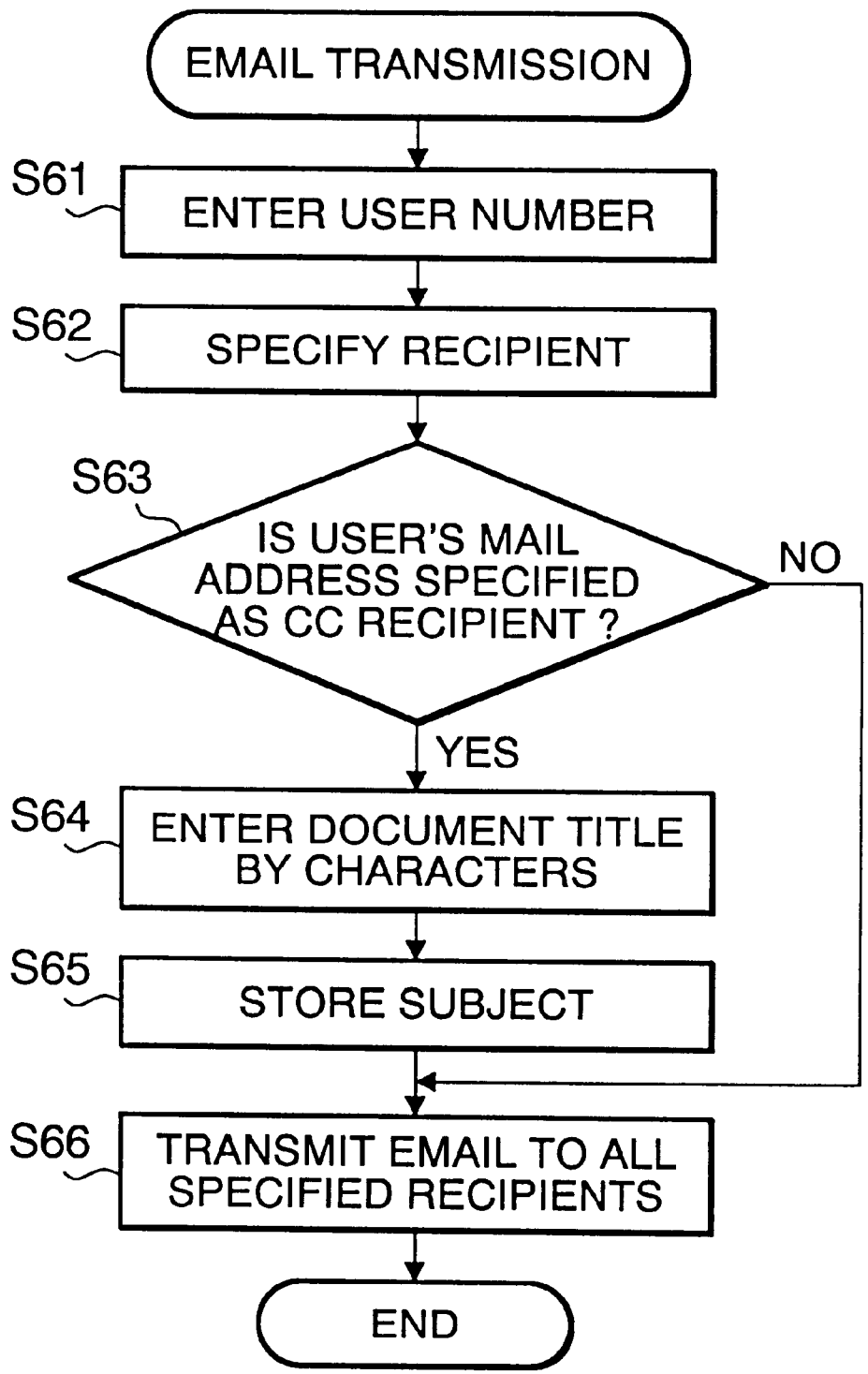
FIG. 8 is a flow chart showing the operation of the communication terminal device of the second embodiment during transmission of electronic mail with a copy of the mail data being saved in the mailbox.
Figure 9:
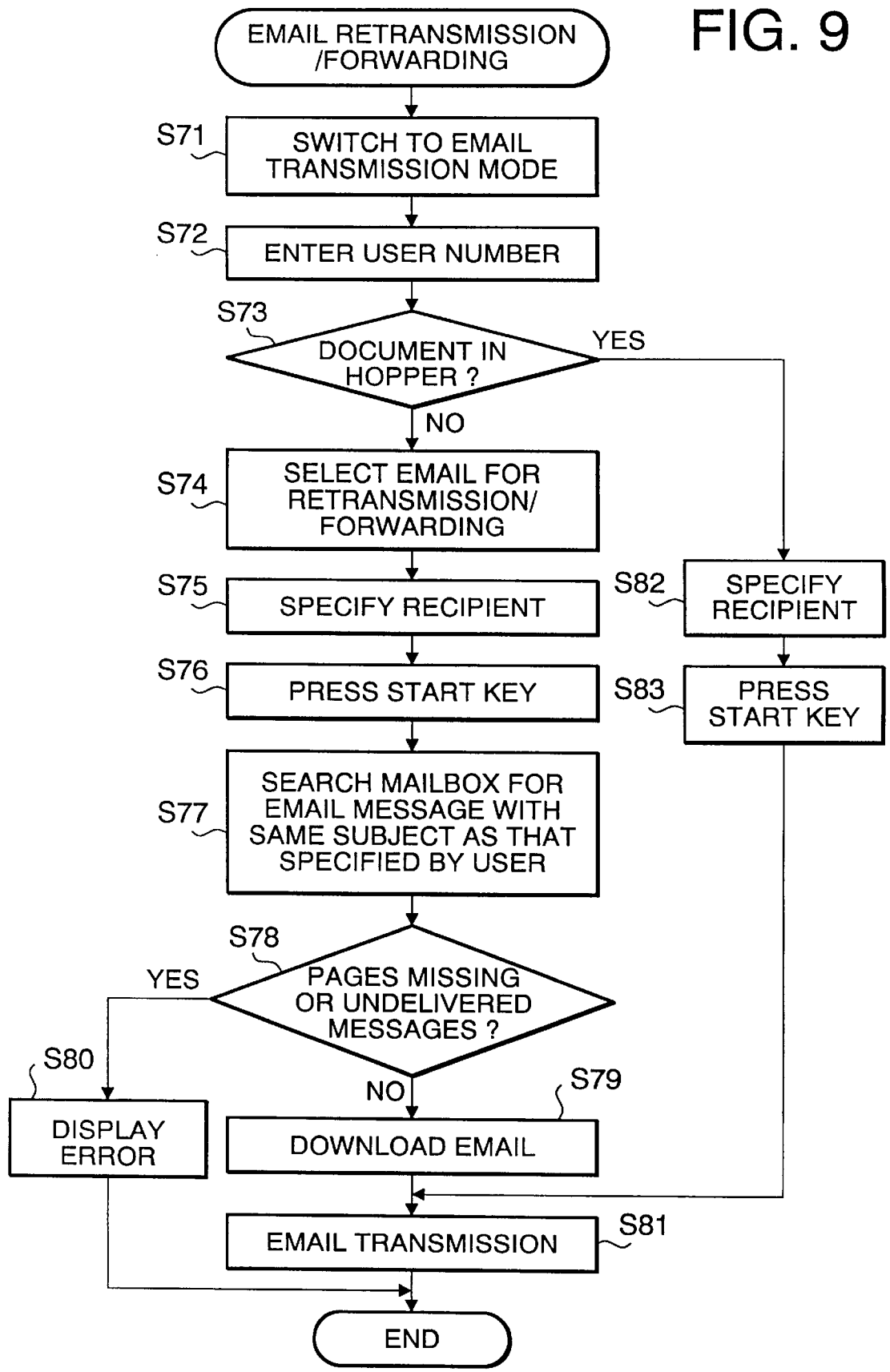
FIG. 9 is a flow chart showing the operation of the communication terminal of the second embodiment using the electronic mail stored in the mailbox by the procedure of FIG. 8 during retransmission or forwarding of electronic mail.

Next, the mail transmission process when the electronic mail image data to be resent or forwarded is stored in a mailbox of the network, and the mail retransmission/forwarding process when the mail data is sent from the network mailbox will be described based on the flow charts in FIGS. 8 and 9.

The user enters their user number (Step S61), and then specifies a recipient by either pressing a one-touch dial key or manually entering the character string of the recipient address (Step S62). When the user hits the start key, the CPU 1 determines whether or not the user's mail address is added as a carbon copy (cc) recipient (Step S63).

If the user is specified as a cc recipient, the facsimile machine F prompts the user to enter the character string of the subject information of the original document to be sent such as title of the document (Step S64), and stores the subject data in RAM 7 (Step S65). Next, the facsimile machine F transmits the image data from the image memory 8 to all addressees by electronic mail (Step S66), and CPU 1 erases the image data from the image memory 8.

If the user is not specified as a cc recipient at Step S63, then the facsimile machine immediately transmits the image data from the image memory 8 to all specified recipients (Step S66), and CPU 1 erases the image data from the image memory 8.

In this way the facsimile machine can save image data which can later be resent or forwarded in the network mailbox by specifying the user itself as one of the cc recipients of the message being sent when electronic mail image data is first transmitted. When the mail is returned and should be resent or the same mail message is to be forwarded to additional recipients, the user switches the facsimile machine F to the electronic mail communication mode from the stand-by mode (Step S71), and enters a user number (Step S72).

The CPU 1 then determines whether or not a document has been placed in the hopper (Step S73). If a document has not been placed in the hopper, the facsimile machine F displays a list of subject information of the documents saved in RAM 7 on the LCD of the display unit 4. By specifying one of numbers assigned to the subject information displayed, the user can select a message to be resent or forwarded to other remote devices (Step S74). Since there is a high probability that the cause of the mail being returned is a mistaken address, the electronic mail address of the concerned message is manually input by the user (Step S75). When the user presses the Start key (Step S76), the CPU 1 searches the mail box on the network for an electronic mail message with the same subject line as that selected by the user at Step S74 (Step S77).

The facsimile machine checks the mailbox to see if there are any pages missing from the mail or if any of the messages were not delivered (Step S78). If there are no missing pages and there are no undelivered messages, then the facsimile machine downloads the electronic mail (Step S29), and transmits it to the recipient specified at Step S75.

On the other hand, if there are missing pages or undelivered mail at Step S78, the facsimile machine displays or outputs an error message (Step S80).

Further, if it is determined at Step S73 that a document has been placed in the hopper, this indicates a normal transmission operation. Therefore, as the recipient is specified either by the one-touch key or by manually input (Step S82) and the start key is pressed (Step S83), the facsimile machine F begins the mail transmission (Step S81).

The above described embodiment has been described as transmission between two facsimile machines, but the present invention also may be used in any electronic mail-communication capable communication terminal device, such as a personal computer.

The above described electronic mail-capable communication terminal devices and electronic mail communication methods are disclosed in Japanese Patent Application Nos. 9-169290 and 9-225306 filed Jun. 25, 1997 and Aug. 21, 1997 and the entire disclosures thereof are incorporated herein by reference.

What is claimed is:

1. A communication terminal device comprising:
   a first transmission section for transmitting electronic mail to a recipient over a network;
   a storage device for storing a copy of the electronic mail transmitted to a recipient in a predetermined area;
   a detection section for detecting presence of returned mail in a mailbox;
   a comparison section for comparing the returned mail with the electronic mail stored in the predetermined area of the storage device; and
   a second transmission section for retransmitting the electronic mail stored in the predetermined area of the storage device when the comparison section determines that the returned mail and the stored mail are the same.

2. The communication terminal device of claim 1, wherein the communication terminal device transmits a copy of the electronic mail being transmitted to the recipient to the communication terminal device itself as an recipient, and wherein the predetermined area of the storage device is a mailbox associated with the communication terminal device on the network.

3. The communication terminal device of claim 1, wherein the predetermined area is an memory associated with the communication terminal device.

4. The communication terminal device of claim 1, wherein the comparison section compares a predetermined portion of information included in the returned mail with a predetermined portion of information included in the electronic mail stored in the predetermined area of the storage device.

5. A method for electronic mail transmission and facsimile communication comprising:

A) transmitting electronic mail to a recipient;

B) copying and storing the electronic mail in a predetermined storage area;

C) detecting presence of returned mail in a mailbox;

D) comparing the returned mail with the electronic mail stored in the predetermined storage area to determine whether they are the same; and E) retransmitting the electronic mail stored in the predetermined storage area to the recipient in the form of electronic mail or facsimile data if the returned mail and the mail stored in the predetermined storage area are the same.

6. The method of claim 5, wherein step B) includes transmitting a copy of the electronic mail being transmitted to the recipient to the communication terminal device itself as a recipient, and wherein the predetermined storage area is a mailbox associated with the communication terminal device on the network.

7. The method of claim 5, wherein the predetermined area is an memory associated with the communication terminal device.

8. The method of claim 5, wherein step D) includes comparing a predetermined portion of information included in the returned mail with a predetermined portion of information included in the electronic mail stored in the predetermined storage area.

* * * * *